United States Patent
Murphy

(10) Patent No.: US 9,747,540 B2
(45) Date of Patent: Aug. 29, 2017

(54) MAGNET MOUNTING PAD WITH RFID TAG

(71) Applicant: Jonathan David Murphy, Friday Harbor, WA (US)

(72) Inventor: Jonathan David Murphy, Friday Harbor, WA (US)

(73) Assignee: AKTIEBOLAGET SKF, Gothenburg (SE)

( * ) Notice: Subject to any disclaimer, the term of this patent is extended or adjusted under 35 U.S.C. 154(b) by 143 days.

(21) Appl. No.: 14/501,660

(22) Filed: Sep. 30, 2014

(65) Prior Publication Data
US 2016/0092763 A1  Mar. 31, 2016

(51) Int. Cl.
*G06K 19/077* (2006.01)
*G01M 13/04* (2006.01)
*G06K 7/10* (2006.01)

(52) U.S. Cl.
CPC ..... *G06K 19/07758* (2013.01); *G01M 13/045* (2013.01); *G06K 7/10425* (2013.01); *G06K 7/10376* (2013.01); *G06K 19/07781* (2013.01)

(58) Field of Classification Search
CPC ....... G06K 19/07758; G06K 19/07781; G06K 7/10366; G06K 7/10425; G06K 7/10376; G01M 13/045
USPC ............................................. 340/10.42, 682
See application file for complete search history.

(56) References Cited

U.S. PATENT DOCUMENTS

| 2004/0139803 | A1* | 7/2004 | Robinson | G01H 11/06 73/650 |
| 2007/0152107 | A1 | 7/2007 | LeFebvre et al. | |
| 2007/0199989 | A1* | 8/2007 | Piety | G06K 19/07749 235/438 |
| 2007/0262875 | A1* | 11/2007 | El-Ibiary | G06K 19/041 340/572.8 |
| 2008/0088460 | A1* | 4/2008 | Copeland | G06K 19/0726 340/572.7 |
| 2008/0122631 | A1 | 5/2008 | Kodukula et al. | |
| 2009/0216497 | A1 | 8/2009 | Schwiers et al. | |
| 2010/0161255 | A1 | 6/2010 | Mian et al. | |
| 2010/0238039 | A1 | 9/2010 | Tethrake et al. | |
| 2011/0253793 | A1* | 10/2011 | King | G06K 19/07728 235/492 |
| 2011/0295546 | A1 | 12/2011 | Khazanov | |

(Continued)

Primary Examiner — Edwin Holloway, III
(74) Attorney, Agent, or Firm — Bryan Peckjian; SKF USA Inc. Patent Dept.

(57) ABSTRACT

An RFID tag reading system affixed to a machine bearing housing is provided. The reading system includes a mobile data collector having an RFID reader for reading a unique identity of the RFID tag, an magnet electro-mechanically connected to the mobile data collector and a magnet mounting pad fixed to the machine housing. The magnet mounting pad having a ferromagnetic contact body for housing the magnet mounting pad and an RFID antenna disposed within the RFID tag for transmitting a unique identity of the RFID tag. The RFID tag is disposed within the ferromagnetic contact body. The magnet is magnetically connected to the magnet mounting pad. The mobile data collector automatically reads the unique RFID tag identity transmitted from the antenna of the RFID tag when the combination mobile data collector and magnet are placed onto the RFID mounting pad.

10 Claims, 4 Drawing Sheets

(56) References Cited

U.S. PATENT DOCUMENTS

| | | |
|---|---|---|
| 2012/0098664 A1 | 4/2012 | Nordin et al. |
| 2012/0187197 A1* | 7/2012 | Masin ............. G06K 19/07758 235/492 |
| 2013/0190897 A1 | 7/2013 | Junk et al. |
| 2014/0081874 A1 | 3/2014 | Lewis et al. |
| 2014/0324389 A1* | 10/2014 | Baldwin ................ G01D 9/005 702/187 |

\* cited by examiner

MAGNET MOUNTING PAD WITH RFID TAG

FIELD OF THE INVENTION

The present disclosure generally relates to a magnet mounting pad to be affixed to a piece of rotating machinery. More particularly, the present disclosure relates to a magnet mounting pad affixed to a piece of rotating machinery having an RFID tag.

BACKGROUND OF THE INVENTION

Data collection is a complicated and expensive effort. The data collecting devices are expensive, too big to put in a pocket and require significant training to use. Data collection usually involves several button presses and complex screens per each measurement taken.

Data is often collected to monitor the operation of industrial machines. SKF model WMCD2 is one such data collection device. Such data collection may be used to diagnose problems, troubleshoot, trend operating changes, or otherwise record data points indicative of machine operation. A variety of data types may be collected, including temperature, vibration, and the like. The data collection may be continuous, i.e., using dedicated resources for individual machines or groups of machines. In other cases, data collection may be on-demand, for example, in routine checking and maintenance of the machines. In the latter case, mobile units may be provided that use sensors that are either permanently or temporarily coupled with the machine being measured.

The advantage of this invention allows the RFID tag to be placed in close proximity to a data collection device with a built in RFID reader like SKF model WMCD2. This makes reading just one RFID tag ID possible, while ignoring any other RFID tags on the machine. Another advantage of this invention is the ability to automatically start a measurement when the data collection device with built in RFID reader and associated magnet are placed on the Magnet Mounting Pad having the RFID tag.

SUMMARY OF THE INVENTION

Embodiments of the disclosure may provide a magnet mounting pad affixed to a machine bearing housing, the magnet mounting pad having a ferromagnetic contact body for housing the magnet mounting pad; an RFID tag having a unique identity and disposed within an unexposed portion of the contact body; and an RFID antenna integral to the RFID tag, the antenna for transmitting the unique identity of the RFID tag.

In a first aspect of the present invention the contact body further provides a disk shaped contact body having a bottom portion, a side portion and a top portion.

In a second aspect of the present invention the unexposed portion provides a well for mounting the RFID tag in the top portion.

In third aspect of the present invention the RFID tag is one of sealed within the well and epoxied in place.

In another aspect of the present invention the RFID tag is sealed within the well with a potting material.

In another aspect of the present invention the RFID tag is of a metal mount type.

In another aspect of the present invention the unique identity can be one of etched into the body and printed on a label and fixed to the body.

In another aspect of the present invention the mounting pad is affixed to the machine bearing housing by being one of epoxied and studded together.

In another aspect of the present invention the RFID tag is associated with a Point ID.

In another aspect of the present invention the Point ID may be preloaded into the RFID tag prior to shipment.

In another aspect of the present invention the metal type RFID antenna may be one of a RFID spiral antenna and a wound inductor antenna.

Embodiments of the disclosure may finally provide an RFID tag reading system affixed to a machine bearing housing is includes. The reading system having a mobile data collector having an RFID reader for reading a unique identity of the RFID tag and an infrared temperature magnet electro-mechanically connected to the mobile data collector. The reading tag system also includes a magnet mounting pad fixed to the machine bearing housing having a ferromagnetic contact body for housing the magnet mounting pad and an RFID antenna disposed within the RFID tag for transmitting a unique identity of the RFID tag. The RFID tag is disposed within the ferromagnetic contact body and the infrared temperature magnet is magnetically connected to the magnet mounting pad. The mobile data collector automatically reads the unique RFID tag identity transmitted from antenna of the RFID tag when the combination mobile data collector and infrared temperature magnet with its mounting magnet are placed onto the RFID mounting pad to form a single system. The RFID tag ID is used by the data collection device to retrieve POINT ID and POINT settings and automatically initiate measurements that may include vibration and temperature measurements.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Hence, specific dimensions and other physical characteristics relating to the embodiments disclosed herein are not to be considered as limiting, unless the claims expressly state otherwise. Also, it should be noted that a wire, electrical contact, electrical connector, etc., could be used as the form of electrical communication between internal device components.

Figure 1:
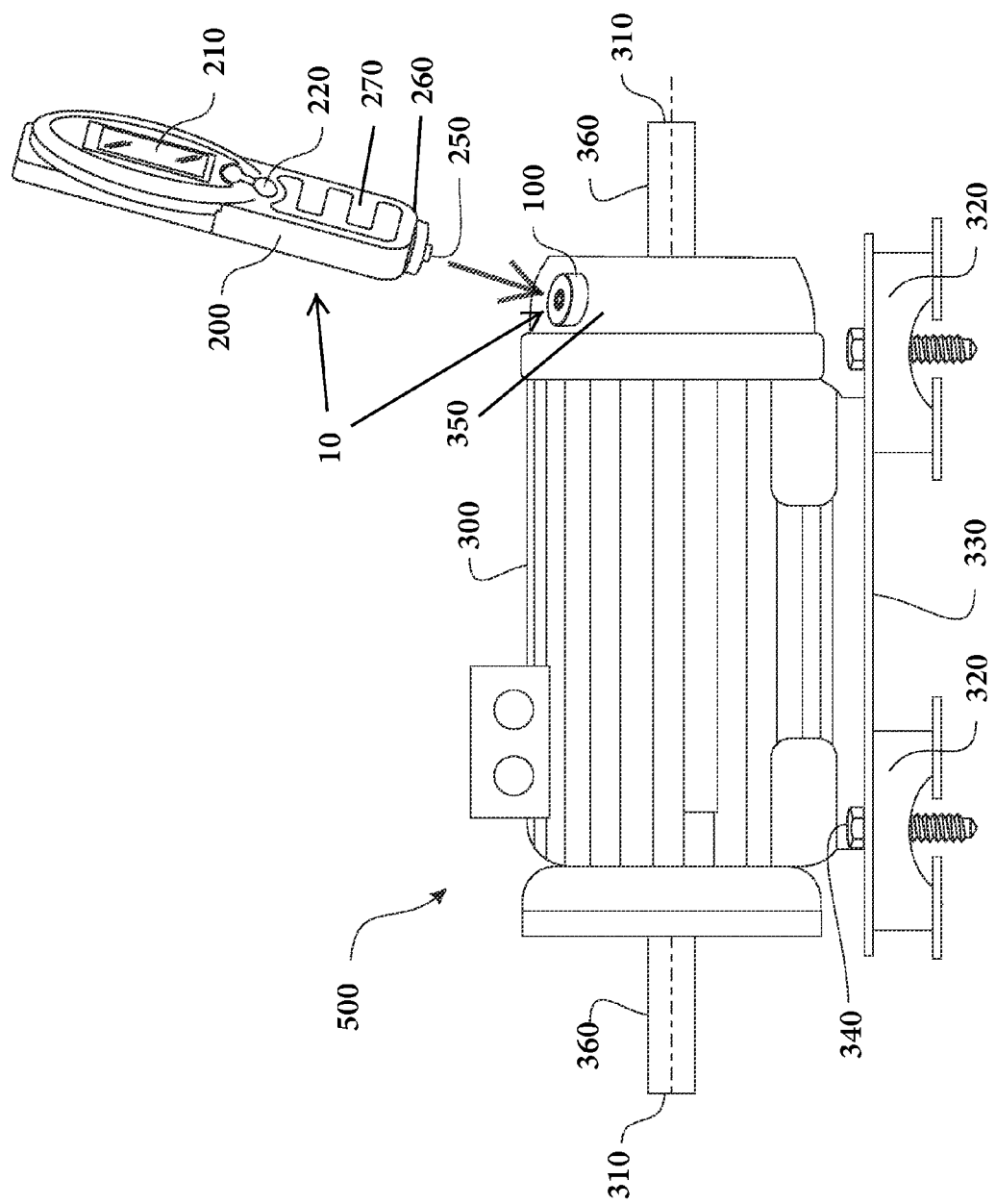
FIG. 1 is a perspective view of a typical assembly showing a hand held data collection device being applied to a magnetic mounting pad that is attached to a piece of rotating equipment according to a preferred embodiment of the present invention.
Figure 2:
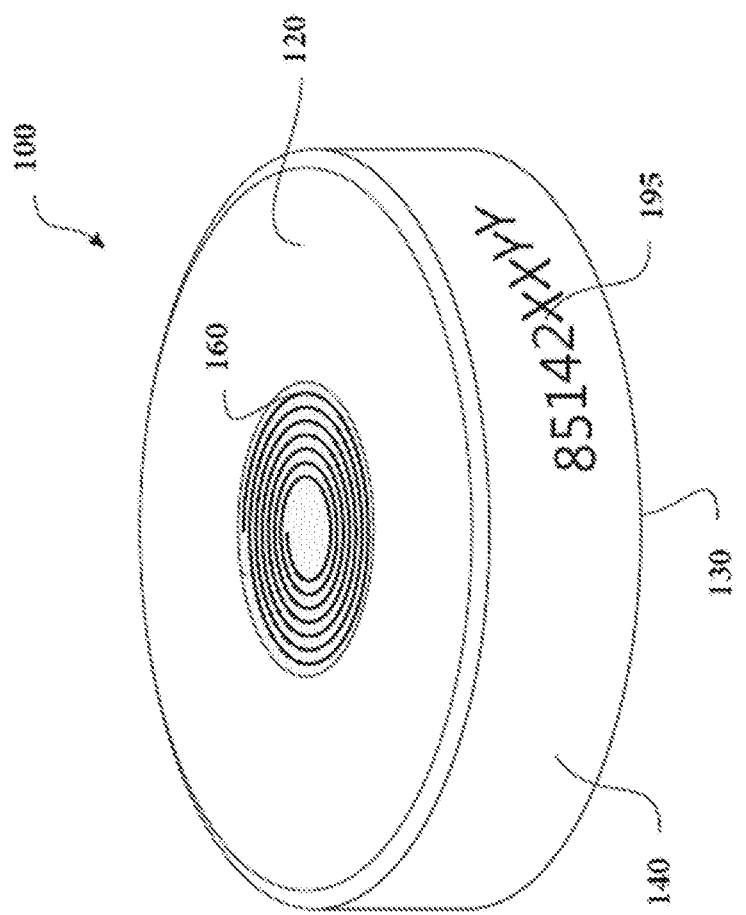
FIG. 2 is an elevated perspective view of the magnetic mounting pad according to a preferred embodiment of the present invention.
Figure 3:
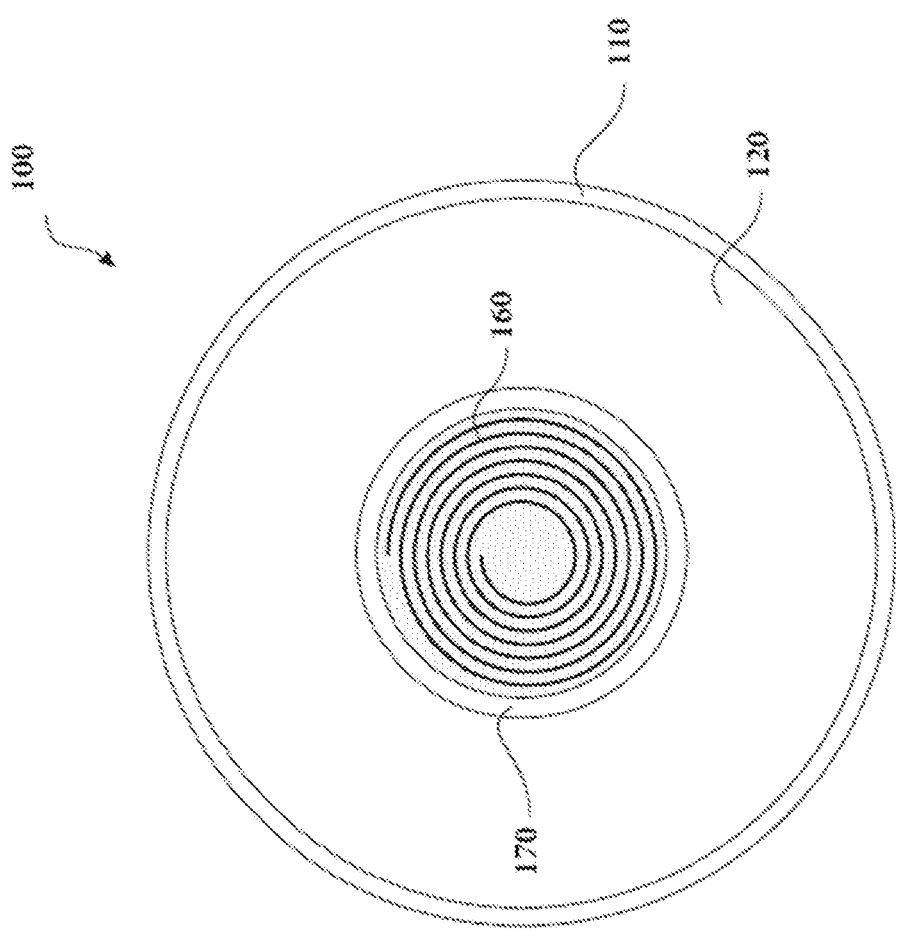
FIG. 3 is a top view of the magnetic mounting pad according to a preferred embodiment of the present invention.
Figure 4:
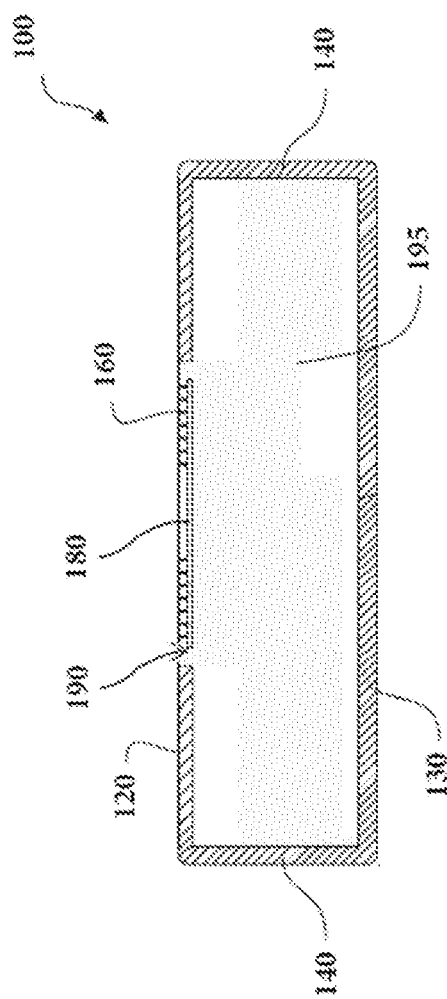
FIG. 4 is a cross-sectional view of the magnetic mounting pad according to a preferred embodiment of the present invention.

For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims.

There is shown in FIG. 1, an RFID tag reading system 10 that includes a mobile data collection device 200 and a magnetic mounting pad, the mobile data collection device 200 is in the process of coming into contact with a magnet mounting pad 100. The magnet mounting pad 100 is already affixed to a machine housing 350. An angularly downward pointing arrow illustrates the path. The combination of the mobile data collection device 200 and magnet mounting pad 100 make up the RFID tag reading system 10.

The reading system 10 and piece of rotating equipment 300 are typically disposed in a manufacturing or operating environment 500. Here, the piece of rotating equipment 300 is depicted as a motor 300, but could be any type of rotating equipment such as a fan, compressor, rotary positioner, conveyor, turbine, generator set, engine, pumps or the like. The machine housing 350 is preferably a machine bearing housing 350 that is in mechanical communication with the piece of rotating equipment 300.

In addition to the machine housing 350, the motor 300 may include two motor shafts 310 as shown. The motor shafts 310 provide coupling surfaces 360, whereby a piece of adjoining equipment, such as a generator or a turbine (not shown) for example, can be coupled thereto. The motor 300 further provides mounting components. In the present embodiment, they include a mounting plate 330, at least two mounting feet 320 and at least two mounting bolts 340. These mounting components allow the rotating equipment to be rigidly mounted to a solid base or floor (not shown) thus minimizing vibration and the affects it could have on measurements collected with the data collection device.

The mobile data collector 200 integrally provides RFID reader circuitry 270 for reading a unique identity of the RFID tag and an temperature magnet 250 electro-mechanically connected thereto. Here, the magnet 250 and the mobile data collector 200 include a plurality of mating electrical contacts (not shown) disposed between the mobile data connector and magnet that facilitate electrical communication. A display 210 and start button 220 are also provided for basic operation of the device. The magnet 250 is typically screwed into a base 260 of the mobile data collector 200 so the aforementioned contacts line up. However, as long as a rigid electromechanical connection is made between the magnet 250 and the data collection device 200, the type of mounting therebetween is not critical to the present invention.

Referring now to FIGS. 1-4, there is shown a ferromagnetic contact body 110 for housing the magnet mounting pad 10. The ferromagnetic contact body 110 provides a disk shaped contact body 110 having a top portion 120, bottom portion 130 and a side portion 140. An RFID tag 180 for transmitting a unique identity of the RFID tag 180 is disposed within an unexposed portion 190 of a well 170 within the ferromagnetic contact body 110. An RFID antenna 160 that is integral to the RFID tag 180 rests in the top portion 120 of an exposed portion of the well 170. The RFID tag 180 with antenna 160 is sealed within the well 170 on assembly. On one hand, they are typically epoxied in place. However, other methods of sealing components within housings, such as the use of a potting material or the like are contemplated in the present invention. The RFID tag portion of the mounting pad consists of a tag IC, circuit board or other printed circuit and antenna. This RFID tag could be a custom designed sub-assembly or an off the shelf RFID tag assembly that is embedded in the mounting pad.

Once the combination mobile data collector 200 and magnet 250 are placed onto the RFID mounting pad, the RFID tag reading system 10 is formed. When the magnet 250 and magnetic mounting pad 100 are magnetically united, the mobile data collector 200 automatically reads the unique RFID tag's 180 identity or Point ID 195, which is transmitted through the RFID antenna 160. In terms of the present invention, a Point ID is defined as a Measurement ID or Location ID.

The mobile data collector 200 can also automatically read Point Settings and automatically initiate measurements that may include vibration and temperature measurements. The Point ID and Point Settings may be pre-set at the factory prior to shipment. Here, the customer orders the tags prior to installation. The factory automatically creates the Points and links them to a customer login and RFID tag identifying info. By having everything preloaded at the factory, the process for the end user or customer is simplified.

In one example, the mobile data collector 200 may include an inductor configured to energize passive RFID tags 180, when the mobile data collector 102 is brought into proximity therewith, and thereby read data such as the tag ID from the RFID tags 180. In other embodiments, the RFID tags 180 may be active RFID tags, which may transmit data to the mobile data collector 200 without requiring the mobile data collector 200 to provide the energizing.

The RFID tag may be a metal mount type. Further, the RFID antenna may either be a RFID spiral antenna or a wound inductor antenna. The unique tag identity 195 can either be etched into the body or printed on a label and fixed to the body 110. In addition, the mounting pad 100 can typically either be affixed to the machine bearing housing by being epoxied or studded together.

The invention claimed is:

1. A magnet mounting pad affixed to a machine housing, the magnet mounting pad comprising;
   a ferromagnetic contact body for housing the magnet mounting pad, the ferromagnetic contact body comprising a well;
   an active RFID tag having a unique identity and disposed within an unexposed portion of the well of the ferromagnetic contact body; and
   an RFID antenna integral to the active RFID tag,
   wherein the RFID antenna transmits the unique identity of the active RFID tag when a magnet of a mobile data collector is magnetically connected to the magnet mounting pad without requiring the mobile data collector to energize the active RFID tag,
wherein the RDIF antenna is disposed within an exposed portion of the well of the ferromagnetic contact body, and
wherein the RFID antenna comprises one of an RFID spiral antenna and a RFID wound inductor antenna.

2. The magnet mounting pad according to claim 1, wherein the ferromagnetic contact body further provides a disk shaped contact body having a bottom portion, a side portion and a top portion.

3. The magnet mounting pad according to claim 2, wherein the active RFID tag is one of sealed within the well and epoxied in place.

4. The magnet mounting pad according to claim 1, wherein the active RFID tag is sealed within the well with a potting material.

5. The magnet mounting pad according to claim 1, wherein the active RFID tag comprises a metal mount.

6. The magnet mounting pad according to claim 1, wherein the mounting pad is affixed to the machine housing by being one of epoxied and studded together.

7. The magnet mounting pad according to claim 1, wherein the machine housing further comprises a machine bearing housing.

8. The magnet mounting pad according to claim 1, wherein the active RFID tag is associated with a Point ID.

9. The magnet mounting pad according to claim 8, wherein the Point ID is preloaded into the active RFID tag prior to shipment.

10. An RFID tag reading system in conjunction with a piece of rotating equipment, the reading system comprising:
a mobile data collector having an RFID reader for reading a unique identity of an active RFID tag;
an magnet electro-mechanically connected to the mobile data collector; and
a magnet mounting pad fixed to a machine housing, the magnet mounting pad comprising:
a ferromagnetic contact body for housing the magnet mounting pad, the ferromagnetic contact body comprising a well;
the active RFID tag having a unique identity and disposed within an unexposed portion of the well of the ferromagnetic contact body; and
an RFID antenna integral to the active RFID tag,
wherein the RFID antenna transmits the unique identity of the active RFID tag and is disposed within an exposed portion of the well of the ferromagnetic contact body,
wherein the RFID antenna comprises one of an RFID spiral antenna and a RFID wound inductor antenna,
wherein the magnet is magnetically connected to the magnet mounting pad,
wherein the mobile data collector automatically reads the unique RFID tag identity transmitted from the RFID antenna of the active RFID tag when the combination mobile data collector and magnet with its mounting magnet are placed onto the RFID mounting pad to form a single system without requiring the mobile data collector to energize the active RFID tag, and
wherein the RFID tag ID is used by the data collection device to retrieve POINT ID and POINT setting information and automatically initiate measurements comprising vibration and temperature measurements.

\* \* \* \* \*